United States Patent Office 2,941,990
Patented June 21, 1960

2,941,990

CYANOETHYLATED POLYMERS

Walter H. Schuller, Kendall, Fla., assignor to American Cyanamid Company, New York, N.Y., a corporation of Maine No Drawing. Filed July 15, 1957, Ser. No. 671,721

9 Claims. (Cl. 260—93.5)

This invention relates broadly to cyanoethylated polymeric compositions. More particularly, it is concerned with a method of preparing such compositions by cyanoethylation of a polymer of a monovinyl-substituted aromatic hydrocarbon; and with the products thereof.

It was known prior to my invention that acrylonitrile could be added, with the aid of alkaline catalysts, to compounds containing one or more atoms of active hydrogen thereby to form cyanoethylated products (see, for example, Compt. rend., 27th Cong. intern. chim. ed. Brussels (1954), III, 363–6, and the bibliography therein; also U.S. Patents 2,608,554–5 to Bullitt, Jr., each dated August 26, 1952). However, to the best of my knowledge and belief it was not known prior to the present invention that the backbone of a polymer of a monovinyl-substituted aromatic hydrocarbon could be cyanoethylated at the alpha-carbon atom, thereby providing polymeric compositions having properties which are different in kind from those of the starting polymeric reactant, e.g., a "free radical"-initiated polymer of a monovinyl-substituted aromatic hydrocarbon, and more particularly styrene, a methylstyrene (a nuclearly-substituted methylstyrene), etc.

It is a primary object of the present invention to provide a new class of polymeric compositions (and more specifically modified polymers of a monovinyl-substituted aromatic hydrocarbon) for use in industry.

It is a further object of the invention to increase the field of utility of polymers of a monovinyl-substituted aromatic hydrocarbon by a treatment which alters their properties, e.g., lowers their melting or softening point and improves their solubility characteristics; and, also, to increase the field of utility of monomeric acrylonitrile.

Another object of the invention is to provide a method of preparing the cyanoethylated polymers of this invention.

Still other objects of the invention will be apparent to those skilled in the art from the following more detailed description and the illustrative examples.

The foregoing objects are accomplished by reacting acrylonitrile and a polymer of a monovinyl-substituted aromatic hydrocarbon, while admixed with a strong base (e.g., an alkali-metal ethoxide, n- or isopropoxide, or tert.-butoxide) as a catalyst for the reaction at a temperature of from about −75° C. to about +75° C., more particularly at from +10° C. to +50° C. The reaction is effected in a mutual solvent for the acrylonitrile and the polymeric reactant that is inert during the reaction, e.g., benzene. The polymeric reactant is one having combined in the polymer molecule more than 55% (that is, an average of more than 55%) by weight of a monovinyl-substituted aromatic hydrocarbon, and preferably it is one having combined in the polymer molecule at least about 65% by weight of such a vinyl-substituted hydrocarbon. It contains in its molecular structure a multiplicity of units represented by the formula

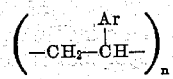

where Ar represents an aromatic hydrocarbon radical and $n$ represents a number having an average value ranging between 8 and 60,000. At the end of the reaction period the cyanoethylated polymer is isolated from the reaction mass. Both benzene-soluble and benzene-insoluble cyanoethylated polymer of the starting polymeric monovinyl-substituted aromatic hydrocarbon can be recovered.

Suitable catalysts (that is, strong bases) for use in carrying out the reaction are given in, for instance, the aforementioned Bullitt, Jr., patents and include alkali-metal alkoxides, aryls and amides, e.g., sodium and potassium ethoxides, n-propoxides, isopropoxides and tert.-butoxides, sodium and potassium amides, phenyllithium, indenyllithium, lithium ethylphenylamide, lithium diphenylamide; and the salts, with alkali-forming metals (group IA and IIA metals), of alkanes, aralkanes, nitriles, amines, etc., e.g., dianiline calcium, ethylsodium, etc. Such catalysts have been described as being salts, with an alkali-forming metal, of an acid having a $pK_a$ of from 15 to 75. Other suitable catalysts include the strongly basic quaternary ammonium hydroxides, e.g., tetramethyl ammonium hydroxide, tetraethanol ammonium hydroxide, benzyl trimethyl ammonium hydroxide, benzyl triethyl ammonium hydroxide, and others.

The base is employed only in catalytic amounts; that is to say, in amounts within the range of from about 0.01% to 5%, and preferably from 0.1% to 2%, by weight of the total weight of monomeric acrylonitrile and polymeric monovinyl-substituted aromatic hydrocarbon.

The polymeric reactant can be either a homopolymer of a monovinyl-substituted aromatic hydrocarbon or a copolymer (including random, graft and block copolymers) having combined in the polymer molecule more than 55%, e.g., from 60% to 99%, by weight of the monovinyl-substituted aromatic hydrocarbon. Such polymers are prepared, for example, by "free radical" initiation of polymerization of the monomer or mixture of monomers with peroxide catalysts, "redox" catalyst systems, etc. Reference is made to the publication, "Styrene—Its Polymers, Copolymers and Derivatives," edited by Boundy et al., published in 1952 by Reinhold Publishing Corporation, New York, N.Y., and especially to chapter 7 (pages 215–297) on "The Polymerization of Styrene," for more detailed information on technique that can be used in polymerizing the monovinyl-substituted aromatic hydrocarbon either alone or with one or more other unsaturated materials which are different from, but copolymerizable with, the monovinyl-substituted aromatic hydrocarbon.

Illustrative examples of monovinyl-substituted aromatic hydrocarbons that can be used in preparing the polymeric reactant are: styrene; the various alkyl (including cycloalkyl) styrenes, e.g., o-, m- and p-methyl-, ethyl-, propyl-, butyl-, amyl-, etc., styrenes, o-, m-, and p-cyclohexylstyrenes, the various isomeric dimethyl-, diethyl-, dipropyl-, etc., styrenes; and the various monovinyl-substituted naphthalenes and alkyl-napthalenes. Reference is made to the aforementioned Boundy et al. publication, "Styrene . . . ," for additional examples.

Illustrative examples of substances that can be copolymerized with the monovinyl - substituted aromatic hydrocarbon to form a copolymeric reactant that is cyanoethylated are vinyl compounds which are different therefrom, including aliphatic compounds containing a $CH_2=C<$ grouping, e.g., acrylonitrile, the various substituted acrylonitriles (e.g., methacrylonitrile, ethacrylonitrile, phenylacrylonitrile, etc.); acrylic acid and the various alpha-substituted acrylic acids, e.g., methacrylic acid, ethacrylic acid, phenylacrylic acid, etc.); esters of the aforesaid acids, more particularly the alkyl esters of an acrylic acid, e.g., the ethyl, propyl, isopropyl, n-butyl, isobutyl, sec.-butyl, tert.-butyl, amyl, hexyl, heptyl, octyl, decyl, dodecyl, etc., esters of acrylic, methacrylic, ethacrylic, phenylacrylic, etc., acids including the alkyl acrylates containing not more than four carbon atoms in the alkyl grouping; vinyl-substituted aromatic or ring compounds which are different from the monovinyl-substituted aromatic hydrocarbons, e.g., the various cyanostyrenes, for instance, o- m- and p-cyanostyrenes, etc., the various vinylpyridines including 2 - vinylpyridine, 2-methyl-5-vinylpyridine, 2-vinyl-5-ethylpyridine, etc.; butadiene; isobutylene; ethylenically unsaturated polycarboxylic acids and the available anhydrides thereof, e.g., maleic acid and anhydride, citraconic acid and anhydride, fumaric acid, itaconic acid, etc., and the esters thereof, e.g., monomethyl and -ethyl fumarates and maleates, dimethyl and -ethyl fumarates and maleates, etc.; unsaturated ethers, e.g., ethyl vinyl ether, propyl vinyl ether, butyl vinyl ether, ethyl allyl ether, diallyl ether, etc.; unsaturated aldehydes, e.g., crotonaldehyde, cinnamaldehyde, etc.; and the various alpha-methylstyrenes, e.g., alpha-methylstyrene itself, the alpha, ortho-, alpha, meta- and alpha, para-dimethylstyrenes, etc.

Still other examples of unsaturated materials that can be copolymerized with the monovinyl-substituted aromatic hydrocarbon in forming the polymeric reactant will be found in the aforementioned Boundy et al. publication, "Styrene . . . ."

In making the copolymeric reactant (more particularly thermoplastic copolymeric reactant), the monovinyl-substituted aromatic hydrocarbon, e.g., styrene, methylstyrene (or mixture of methylstyrenes), etc., is employed in the mixture of comonomers in an amount such that more than 55% by weight of combined monovinyl-substituted aromatic hydrocarbon is present in the copolymer. When the polymerization rates of the said unsaturated aromatic hydrocarbon and additional monomer or monomers are different from each other, then it may be necessary to start with an amount of the said unsaturated hydrocarbon either more or less than 55% by weight of the total mixture of monomers in order that the final copolymer will contain more than 55% by weight of combined monovinyl-substituted aromatic hydrocarbon in the copolymer molecule.

The average molecular weight of the polymeric reactant used in practicing the present invention can be varied widely, as desired or as conditions may require, but ordinarily is within the range of from about 400 to about 3,000,000 or more as calculated from viscosity measurements using the Staudinger equation; or by determining the average molecular weight by other known methods and converting the value thereby obtained to a "Staudinger" average molecular weight. For more detailed information on the molecular weight of a polymer of a monovinyl-substituted aromatic hydrocarbon, specifically polystyrene, and methods of determination, see the aforementioned Boundy et al. publication, and particularly chapter 9, "Molecular Weight and Solubility of Polystyrene."

The proportions of monomeric acrylonitrile to polymeric reactant likewise can be widely varied depending, for example, upon the time and temperature of reaction, the kind and amount of strong base used as a catalyst for the reaction, the degree of cyanoethylation desired, and other influencing factors. In general, however, the monomeric acrylonitrile is employed in a ratio of at least 1 molecule thereof for each 100 alpha-carbon atoms in the backbone of the polymer of the monovinyl-substituted aromatic hydrocarbon. One can also use a ratio of 100 molecules of monomeric acrylonitrile for each 100 alpha-carbon atoms in the polymer backbone when a higher degree of cyanoethylation is desired. Ordinarily, the monomeric acrylonitrile is employed in excess (e.g., from 50% to 1500% or more in excess) of that theoretically required to effect the desired degree of cyanoethylation under the particular reaction conditions.

In practicing the present invention the reaction between the monomeric acrylonitrile and poly-(monovinyl-substituted aromatic hydrocarbon) is effected in an inert, mutual solvent for said reactants; that is, a mutual solvent, more particularly a mutual, organic solvent, that is inert during the course of the reaction. Illustrative examples of such solvents are Benzene
Toluene
Xylene
Aromatic naphthas
Diethyl ether The time of the reaction varies widely, depending upon the particular reaction conditions, and may range, for example, from a few minutes to two weeks or more.

If desired, the reaction mass can be neutralized at the end of the reaction period, e.g., by the addition of an acidic substance such as ammonium chloride, acetic acid or the like. After removing unreacted acrylonitrile, if present, the cyanoethylated poly-(monovinyl-substituted aromatic hydrocarbon) is then isolated either as a single product or in fractions having different physical characteristics, e.g., different softening points and solubilities.

In order that those skilled in the art may better understand how the present invention can be carried into effect, the following examples are given by way of illustration and not by way of limitation. All parts and percentages are by weight.

*Example 1*

One hundred (100) grams of free-radical-initiated polystyrene (homopolymeric polystyrene) is dissolved in 1000 ml. of benzene, and to the resulting clear solution is added 100 ml. of a 5% solution of sodium tert.-butoxide in tert.-butanol, followed by 200 ml. of acrylonitrile. No exotherm is noticed. After standing for eight days at room temperature (20°–30° C.), the reaction mass is observed to be somewhat viscous. It is centrifuged clear, and the clear, yellow centrifugate (filtrate) is poured into a large excess of methanol. The resulting precipitate is isolated by filtration, washed with methanol and dried; weight, 82 grams. The dried material is re-dissolved in benzene and precipitated again with methanol, collected, washed and dried; weight, 72 grams. An infrared spectrum on this material indicates the presence of about 5% of nitrile groups. Since base-initiated polyacrylonitrile is insoluble in benzene (as is also free-radical-initiated polyacrylonitrile) it properly can be concluded that the nitrile groups are chemically bound in the polystyrene by a cyanoethylation reaction.

The solid material centrifuged from the reaction mass is washed with benzene and dried; weight, 17 grams. An infrared spectrum on this benzene-insoluble product shows the presence of from 5% to 8% of phenyl groupings as well as a substantial number of $CH_2CN$ groupings. As polystyrene is benzene-soluble, it properly can be concluded that the phenyl groupings are present in a benzene-insoluble, cyanoethylated polymer of styrene, which latter is admixed with a quantity of base-initiated polyacrylonitrile.

The products of this example, and especially the benzene-soluble cyanoethylated polymer, can be used to modify other synthetic resins and polymers, especially in cases where it is desired to lower the softening point and/or to improve the solubility characteristics; in making molding compositions (especially when a cross-linking agent is incorporated therein); as a component of coating compositions; and for numerous other purposes.

*Example 2*

Fifty (50) grams of a copolymer of about 72% styrene and about 28% acrylonitrile is dissolved in 1000 ml. of benzene, after which 200 ml. of acrylonitrile is added thereto. The "light-scattering" molecular weight of this styrene-acrylonitrile copolymer is about 50,000. To the clear solution is slowly added, over a 20-minute period, 20 ml. of 1.0 N potassium tert.-butoxide in tert.-butanol. A very slight exotherm is noticed. Seven hours later about one-half of the reaction mass is centrifuged free of a heavy, gelatinous precipitate. Upon close inspection the centrifugate seems to consist of a microgelatinous material dispersed in benzene, rather than being a true solution. This dispersion of microgel is added to a large excess of benzene-denatured ethyl alcohol. A yellow product precipitates. It is isolated by filtration, washed with ethanol and dried; weight, 12 grams. [Instead of effecting precipitation of the product by adding the dispersion of microgel to a large excess of denatured ethanol, the product can be precipitated (coagulated) by the addition of more benzene to the above-described dispersion in benzene of the microgelatinous material.]

The dried, polymeric precipitate is rubbery in nature. An infrared spectrum on this product indicates the presence of about 57 mole percent of nitrile groupings and about 43 mole percent of phenyl groupings. The ratio of $CH_2/CH_2CN$ is about 4/1. (A fully cyanoethylated copolymer of 72% styrene and 28% acrylonitrile, which had been cyanoethylated on the acrylonitrile moiety only and not on the phenyl moiety, would exhibit a $CH_2/CH_2CN$ ratio of 3.3/1 as an upper limit and a nitrile-to-phenyl ratio of 60 mole percent nitrile/40 mole percent phenyl as an upper limit. However, in view of the fact (as shown by Example 1) that homopolymeric styrene itself can be cyanoethylated to some extent, it would be logical to conclude that, in the product just described, cyanoethylation has been effected on both the phenyl moiety and on the acrylonitrile moiety.)

The material which has been centrifuged from the reaction mass is washed and dried; weight, 11 grams. An infrared spectrum on this product indicates the presence of about 24 mole percent of phenyl groupings and about 76 mole percent of nitrile groupings. The ratio of $CH_2/CH_2CN$ is about 30/1. These data indicate that this fraction also has been cyanoethylated to some extent, presumably (for the reasons stated above) on both the phenyl moiety and the acrylonitrile moiety.

The cyanoethylated products of this example can be molded into articles having a high-impact strength, for instance by compression-molding for 10 to 15 minutes in a mold at about 280°–300° F. under a pressure of from about 1000 to 2000 pounds per square inch.

The present invention is especially applicable in modifying, by cyanoethylation, copolymers of different monovinyl-substituted aromatic hydrocarbons, more particularly copolymers of different styrenes. An example of such a copolymer is a ternary polymer of the various methylstyrenes.

When the three possible isomers of methylstyrene are polymerized in a particular ratio by conventional catalytic methods, a ternary polymer having a high heat-distortion temperature is obtained. In such ternary polymers the weight ratios of the different isomers of methylstyrene advantageously are: from about 25% to about 40% ortho-methylstyrene; less than about 5% meta-methylstyrene; and from about 60% to about 75% para-methylstyrene. A particularly useful composition is one wherein the meta isomer is less than about 2% by weight, the ortho isomer is present in the polymer in a weight ratio of from about 28% to about 35%, while the para isomer is present in the polymer in a weight ratio of from about 65% to about 72%. Objects formed by compression-molding or by injection-molding of the above-described ternary polymers have heat-distortion temperatures which, in general, are about 10° C. higher than articles similarly molded from homopolymeric styrene of approximately the same average molecular weight. The aforementioned ternary polymers are not my invention, but do constitute a valuable polymeric reactant for use in practicing the present invention.

To increase the flexural strength, impact strength, chemical resistance and other useful properties of the aforementioned ternary polymers of isomers of methylstyrene, it has been suggested that one polymerize a mixture of acrylonitrile and the aforementioned mixture of isomeric methylstyrenes, more particularly in the following percentages by weight:

| | Percent by weight |
|---|---|
| Acrylonitrile | About 5 to about 40 |
| Mixture of isomers of methylstyrene comprised of, by weight, from about 25% to about 40% ortho-methylstyrene; less than about 5% meta-methylstyrene; and from about 60% to about 75% para-methylstyrene | About 95 to about 60 |

The present invention obviates the necessity for copolymerizing acrylonitrile with the aforementioned mixture of methylstyrene isomers and the attendant difficulties in producing four-component polymers of uniform characteristics, for instance uniform average molecular weight and within a narrow range of molecular weights.

*Example 3*

A ternary polymer of ortho-, meta-, and para-methylstyrenes is prepared as follows:

The three isomers of methylstyrene in the ratio of 30% by weight of ortho, 3% by weight of meta and 67% by weight of para, together with a small amount of a polymerization catalyst, are introduced into a tube which is subsequently purged with nitrogen gas, sealed and placed in an oil bath wherein bulk polymerization of the monomers is carried out. The catalyst used is benzoyl peroxide, and it is employed in an amount corresponding to 0.1% by weight of the monomeric mixture. The monomers are copolymerized by heating for 5 days at 100° C. and for 2 days at 130° C. The average molecular weight of the resulting ternary polymer is about 88,000. It is soluble in toluene. An injection-molded article made from this ternary polymer has a heat-distortion temperature of 93° C.

The above-described ternary polymer is cyanoethylated in essentially the same manner as described under Example 1 with the exception that toluene, instead of benzene, is used as the mutual organic solvent in which the reaction between the acrylonitrile and the ternary polymer is effected. The cyanoethylated product has a higher softening point than the corresponding product of Example 1. Articles molded from the cyanoethylated ternary polymer have higher impact- and flexural-strength characteristics than articles similarly molded from the starting ternary polymer reactant.

*Example 4*

Using the polymerization technique described under Example 3, a four-component polymer is prepared from a mixture of about 38% acrylonitrile, about 19.5% ortho-methylstyrene, about 1.5% meta-methylstyrene and about 41% para-methylstyrene. This copolymer is cyanoethylated in essentially the same manner as described under Example 2 with the exception that, instead of using benzene (dry benzene) as the mutual organic solvent for the reactants, there is employed a 1:1 mixture, by volume, of dry benzene and dimethylformamide. Articles molded from the cyanoethylated four-component polymer have higher flexural and impact strengths than articles similarly made from the starting polymeric material.

It is to be understood that this invention is not limited to the specific ingredients named in the above illustrative examples nor to the particular proportions and methods named therein. Thus, instead of benzene, toluene or a mixture of benzene and dimethylformamide as the inert, mutual, organic solvent in which the reaction is effected, one can use any other mutual solvent for the acrylonitrile monomer and the poly-(monovinyl-substituted aromatic hydrocarbon) that is inert during the reaction, numerous examples of which have been given hereinbefore. Or, one can use mixtures of different, inert, mutual solvents in any proportions, such as mixtures of those specifically named; or mixtures with diluents which alone are non-mutual solvents for either or both of the reactants but conjointly with a mutual solvent are capable of dissolving the reactants. Variations in catalyst and amount thereof, in proportions of acrylonitrile and poly-(monovinyl-substituted aromatic hydrocarbon), in time, temperature and other conditions of reaction, etc., also can obviously be made, as has been indicated in the portion of this specification prior to the examples. Also, instead of the particular polymeric reactants employed in the individual examples one can use, in lieu of part or all of any of them, any other homopolymeric monovinyl-substituted aromatic hydrocarbon or a copolymer thereof, as the latter has been defined hereinbefore; and of which homopolymers and copolymers numerous examples previously have been given.

Other uses of the cyanoethylated poly-(mono-vinyl-substituted aromatic hydrocarbons) include their use in blends with both homopolymers and copolymers of a poly-(monovinyl-substituted aromatic hydrocarbon) to impart better flow characteristics thereto during molding or otherwise forming shaped articles therefrom; and in plasticizing or otherwise modifying, to improve the useful properties thereof, a wide variety of other addition and condensation polymers, natural gums and resins, etc., including various polyvinyl resins, ureaformaldehyde resins, phenol-formaldehyde resins, melamine-formaldehyde resins, epon resins, alkyd resins, polyester resins, rosin, shellac, and others. A field of particular utility is in the production of molding compositions and molded articles, in conjunction with a cross-linking agent thereby to obtain a thermoset product.

By cyanoethylating the alpha-carbon atom of the backbone chain of a polymer of a monovinyl-substituted aromatic hydrocarbon, a new class of modified polymers of the aforesaid unsaturated aromatic hydrocarbon has been provided, with properties that can be varied merely by varying the degree of cyanoethylation and the composition and molecular weight of the polymeric reactant. I have discovered that the reaction involved in this invention provides an extremely valuable and useful "tool" whereby the properties of the starting polymeric reactant can be modified over a very wide range; thus, in general, solubilities can be increased and softening points decreased. This is an effect which is opposite in direction to the change in properties that are obtained as one goes from an amorphous to a crystalline vinyl polymer.

The cyanoethylated poly-(monovinyl-substituted aromatic hydrocarbons) of this invention differ from the conventional graft-type copolymer of a monovinyl-substituted aromatic hydrocarbon in that each grafted chain extending off the backbone chain is only one monomer unit in length. Their properties lie, in general, between those of a random-type copolymer and a conventional graft-type copolymer of the aforesaid unsaturated hydrocarbon and in which the chain lengths off the backbone chain may vary, for instance, from 10 to 1000 monomer units in length.

The reaction for cyanoethylating vinyl polymers does not appear to be a general one; and apparently is dependent upon the presence in the polymer of electron-withdrawing groups (or the equivalent thereof if not actually such groups) which, even though they may be relatively weak electron-withdrawing groups or the functional equivalent thereof, permit the reaction to proceed. That the reaction could be caused to take place was quite unexpected and in no way could have been predicted from the known properties of acrylonitrile and of polymers of poly-(monovinyl-substituted aromatic hydrocarbons), or from the published information on the cyanoethylation reaction.

From the foregoing it will be seen that the present invention provides means whereby products can be readily and economically "tailored" for a specific use in the plastic, coating, molding, laminating, adhesive and related arts. The practical advantages of this will be immediately apparent to those skilled in the art.

I claim:

1. A method of preparing a cyanoethylated polymeric composition which comprises reacting at a temperature of from about −75° C. to about +75° C., ingredients consisting of monomeric acrylonitrile and a polymer having combined in the polymer molecule at least 55% by weight of a monovinyl-substituted aromatic hydrocarbon and from 0 to 45% of an aliphatic compound containing a $CH_2=C<$ grouping, in a ratio of at least one molecule of said acrylonitrile to 100 alpha-carbon atoms in the backbone of said polymer, the molecular structure of said polymer having at least 55% of its units of the formula

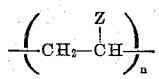

$n$ represents a number having an average value between 400 and 60,000, where Z represents a member of the class of radicals consisting of benzene, monoalkyl substituted benzene, dialkyl substituted benzene, monocyclohexyl benzene, naphthalene and monoalkyl substituted naphthalene, the said alkyl group having from 1 to 5 carbon atoms, the said ingredients being admixed with from 0.01% to 5% by weight based on the total weight of said polymer and monomer of a catalyst for the reaction, said catalyst being selected from the class consisting of an alkali metal salt of (a) an acid having a $pK_a$ of from 15 to 75, (b) tetramethyl ammonium hydroxide, (c) tetraethanol ammonium hydroxide, (d) benzyl trimethyl ammonium hydroxide and (e) benzyl triethyl ammonium hydroxide, said reaction being effected in a mutual organic solvent for said acrylonitrile and said polymer and which is inert during the course of the reaction, and isolating the resulting polymer from the reaction mass.

2. A method as in claim 1 wherein the catalyst is an alkali-metal alkoxide.

3. A method as in claim 1 wherein the alkali-metal alkoxide is an alkali-metal tert.-butoxide.

4. A method as in claim 1 wherein the alkali-metal tert.-butoxide is sodium tert.-butoxide.

5. A method as in claim 1 wherein the alkali-metal tert.-butoxide is potassium tert.-butoxide.

6. A method as in claim 1 wherein the monovinyl-substituted aromatic hydrocarbon is styrene.

7. A method as in claim 1 wherein the monovinyl-substituted aromatic hydrocarbon is a methylstyrene.

8. A method as in claim 1 wherein the reaction is carried out at a temperature of from +10° C. to +50° C.

9. A method as in claim 1 wherein the mutual solvent is benzene.

References Cited in the file of this patent

UNITED STATES PATENTS

| | | |
|---|---|---|
| 2,341,553 | Houtz | Feb. 15, 1944 |
| 2,538,779 | Harrison et al. | Jan. 23, 1951 |
| 2,608,554 | Bullitt | Aug. 26, 1952 |
| 2,608,555 | Bullitt | Aug. 26, 1952 |
| 2,666,042 | Nozaki | Jan. 12, 1954 |
| 2,732,363 | Coover et al. | Jan. 24, 1956 |

FOREIGN PATENTS

| | | |
|---|---|---|
| 679,562 | Great Britain | Sept. 17, 1952 |